Nov. 9, 1965  S. M. TERRY ETAL  3,217,194
ELECTRICAL GENERATOR OF THE INDUCTOR TYPE
Filed May 16, 1961  2 Sheets-Sheet 1

INVENTORS
STANLEY M. TERRY
BOB O. BURSON
BY
Telber, McCormick, Paulding & Huber
ATTORNEYS Nov. 9, 1965  S. M. TERRY ETAL  3,217,194
ELECTRICAL GENERATOR OF THE INDUCTOR TYPE
Filed May 16, 1961  2 Sheets-Sheet 2
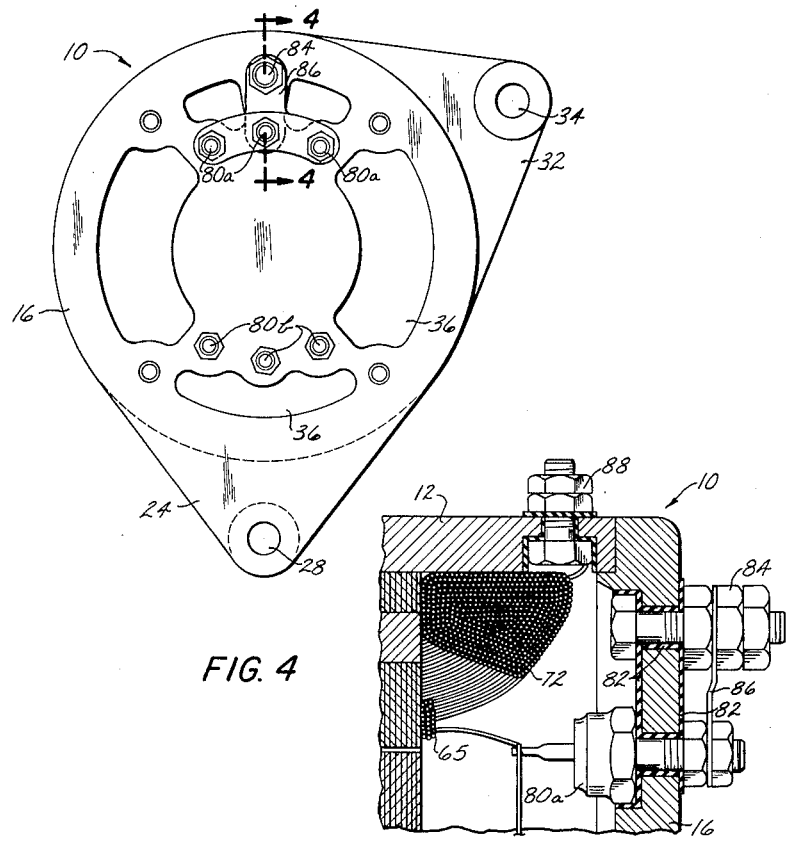
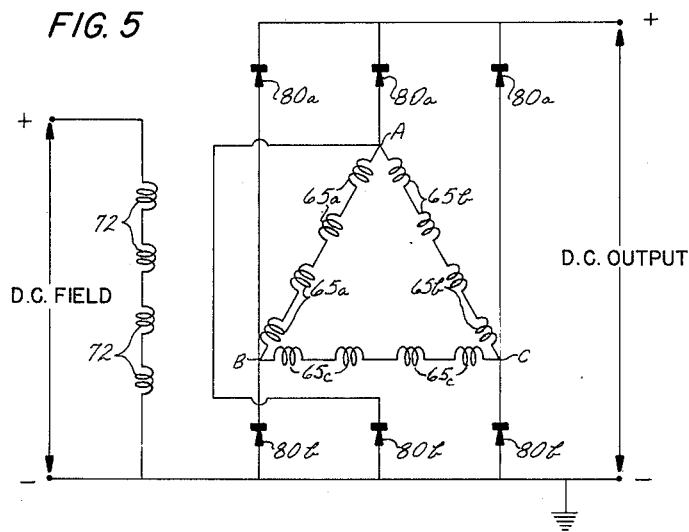

United States Patent Office 3,217,194
Patented Nov. 9, 1965

3,217,194
ELECTRICAL GENERATOR OF THE
INDUCTOR TYPE
Stanley M. Terry and Bob O. Burson, both of Long-
meadow, Mass., assignors, by mesne assignments, to
R. E. Phelon Company, Inc., East Longmeadow, Mass.,
a corporation of Massachusetts
Filed May 16, 1961, Ser. No. 110,500
5 Claims. (Cl. 310—68)

This invention relates to electric generators of the electromechanical type for converting mechanical power into electrical power, and deals more particularly with an improved electric generator of the foregoing type in which the field and armature windings are both fixed relative to the stator and which operates without slip rings, commutators, or other moving or sliding contacts.

The general object of this invention is to provide a variable speed electric generator, for use for example in the electrical system of an automobile, and which generator is of lower cost and has better performance characteristics than the generators commonly used heretofore in automobiles and in other similar variable speed applications.

A more specific object of the invention is to provide a direct current generator adapted for use in automobiles and other similar applications and which generator, among other things, is of a low cost construction, is of a rugged construction with few moving parts and a long service life, is capable of high speed operation with no bad effects, reduces belt wear by means of a low inertia rotor, and requires no slip rings, commutators or other moving or sliding contacts so as to improve performance, reduce wear and eliminate explosion hazards.

Another object of this invention is to provide a direct current generator of the foregoing character capable of providing a relatively high output at low rotor speeds, so that if installed in an automobile for example the output will be sufficient to power the ignition system and normal electrical accessories even while the engine is idling without discharging the battery, and which is self-limiting at higher rotor speeds so that no excessive currents or voltages will be obtained.

A further object of this invention is to provide an electric generator of the inductor alternator type employing no moving contacts, which generator may be used to directly replace commutator types of engine driven generators, as in automobiles and the like, and which may include an integral rectifying system so as to produce a direct current output.

Another object of this invention is to provide an electric generator having an open ventilated design and which can be operated under conditions of extreme severity including wet and dusty atmospheres and hazardous explosive conditions with no special protective provisions.

Another object of this invention is to provide a novel inductor alternator which, among other things, makes highly efficient use of its iron structure, and in which the magnetic flux is constant in the main body of the machine thus contributing to quiet operation by reducing the iron noise and permitting the use of a solid flux-carrying frame rather than a laminated or non flux-carrying frame.

The electric generator of this invention is similar in some respects to that shown by Steinmetz in Patent No. 559,419. The Steinmetz machine, however, is a relatively large and inefficient device and as far as is known is no longer used at this time, its place having been taken by other more efficient types of generators. This invention, however, concerns certain improvements, relating to tooth arrangement, rotor size, rotor mounting, pole shape and the like, in the Steinmetz type of generator whereby the efficiency is increased and the generator made highly suitable for use in automobiles and other similar applications.

Other objects and advantages of the invention will be apparent from the description which follows and from the drawings forming a part thereof.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 3 is right-hand end elevational view of the generator shown in FIG. 1.

FIG. 4 is an enlarged fragmentary longitudinal sectional view taken on the line 4—4 of FIG. 3.

FIG. 5 is a schematic wiring diagram illustrating the manner in which the various coils and other electrical components of the generator are interconnected.

Figure 1:
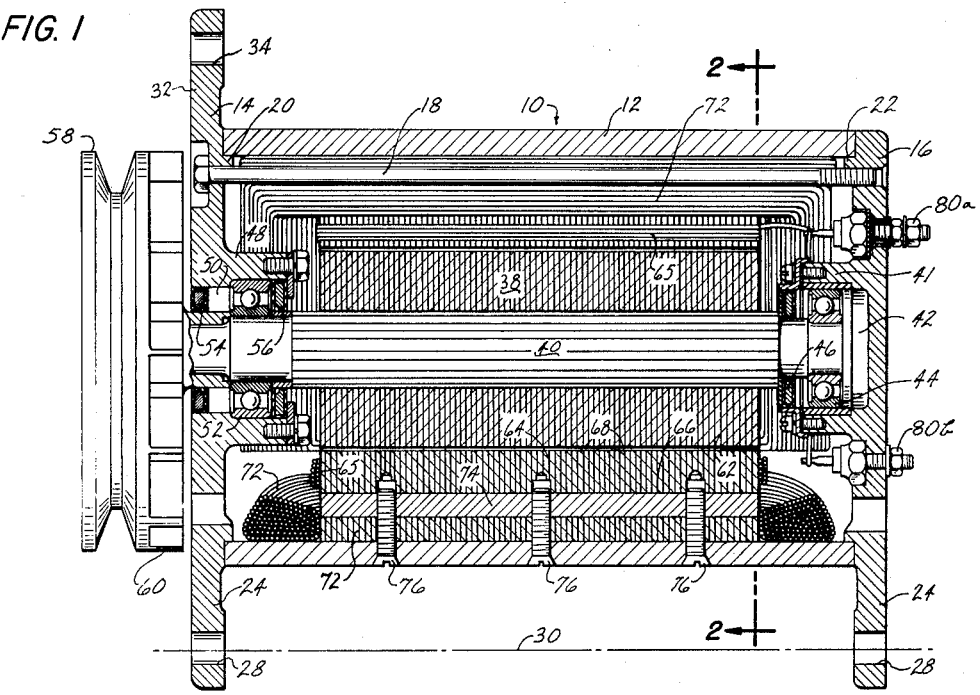
FIG. 1 is a longitudinal sectional view taken through an electric generator embodying this invention, the view being taken on the line 1—1 of FIG. 2.
Figure 2:
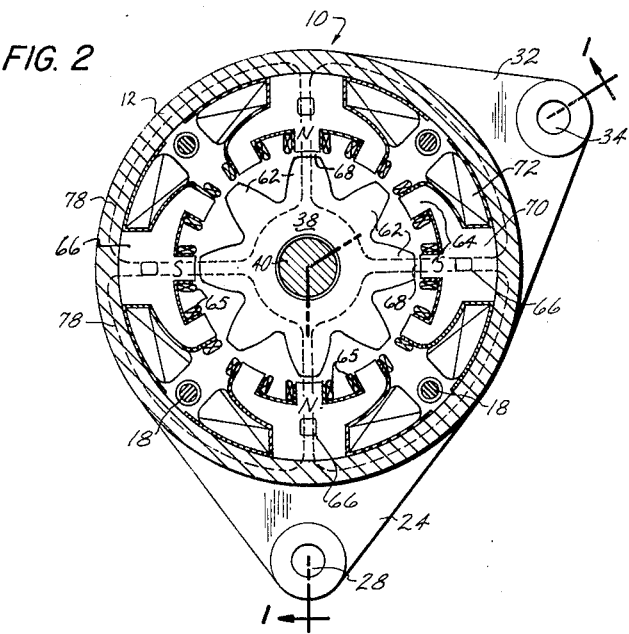
FIG. 2 is a transverse sectional view taken on the line 2—2 of FIG. 1.

Referring now more particularly to the drawings, an electric generator embodying this invention is indicated generally by the reference numeral 10 in FIGS. 1 to 4, inclusive. The illustrated generator is adapted for use in conjunction with the electrical system of an automobile or the like and for this reason is designed so that it may directly replace the commutator type of direct current generators commonly used in automobiles. The generator, however, is not particularly limited to the illustrated design and may take various shapes and forms different from those shown depending on its application, the illustrated generator being shown by way of example only.

The generator 10 includes an annular outer frame 12, which is preferably of a cylindrical shape, as shown, and which may be fabricated from a length of solid steel tubing or form a piece of plate stock bent into a cylindrical shape. Fixed to the frame 12 are two end pieces 14 and 16 which respectively engage opposite ends of the frame and are axially held in place by suitable means such as four tie bolts 18, 18 which extend through the frame 12, the bolts 18, 18 at one end having heads engaging one of the end pieces and at the other end being threadably received by the other end piece as shown in FIG. 1. The end pieces are centered with respect to the frame by cylindrical locating shoulders 20 and 22, respectively, which fit with the inner surface of the frame.

For use with an automobile engine or the like the generator is preferably adapted to be belt driven and includes means adapted to provide a pivotal support whereby the generator may be adjustably positioned to take up slack in the belt. In order to allow such pivotal mounting to the driving engine or other supporting structure each of the generator end pieces 14 and 16 includes an ear 24 which extends outwardly beyond the frame 12 and is provided with an opening 28 longitudinally aligned with the corresponding opening 28 in the other ear. The openings 28, 28 in turn receive pins, a common shaft or other means for attaching the generator to supporting structure for pivotal movement about the common axis 30 of the two openings 28, 28. One of the end pieces, in this case the end piece 14, is also provided with a second ear 32 having an opening 34. The ear 32 and opening 34 serve to cooperate with suitable means such as a bolt and slotted bar for holding the generator in various selected positions about the pivot axis 30.

As shown best in FIG. 3, the generator 10 is or may be of an open ventilated construction so that cooling air may flow through the interior thereof. For this purpose each of the end pieces is provided with ventilating openings as shown at 36, 36.

The end pieces 14 and 16 additionally include means for rotatively supporting the rotor of the generator, which rotor in the present case is comprised of a windingless core 38 fixed to a central shaft 40. As viewed in FIG. 1, the right-hand end piece 16 includes a leftwardly extending boss 41 having a closed bore 42 which receives a ball bearing unit 44 for supporting the right-hand end of the shaft 40. To the left of the bearing unit 44 is a seal 46 fixed by suitable means to the boss 41 and serving to seal the bearing 44 against the escape of lubricant and the entrance of dirt and other foreign matter. The left-hand end piece 14 also includes a boss 48 having a through bore 50 through which a portion of the shaft 40 extends. The bore 50 is fitted with a ball bearing unit 52 which rotatively supports the left-hand end of the rotor shaft 40. Associated with the boss 48 are two seal units 54 and 56 located on opposite sides of the bearing unit 52 to seal the bearing against the escape of lubricant and the entrance of dirt or other foreign matter.

The outboard end portion of the rotor shaft 40 has fixed thereto a pulley 58 adapted for cooperation with a belt for driving the rotor. In the illustrated case the pulley 58 is shown to be of a type adapted for use with a V-belt but, regardless of the type of belt with which the pulley is adapted for use, it preferably includes an impeller portion 40 located adjacent the end piece 14 and having vanes or the like for forcing air through the ventilating openings of the end piece 14 when the pulley is rotated by its belt.

The core 38 of the rotor, as mentioned, is of a windingless construction and preferably comprises a plurality of laminations axially stacked on the rotor shaft 40. The laminations are fixed to the rotor shaft by suitable means such as press-fitting and in order to more securely hold the laminations to the shaft the shaft may include a series of longitudinal grooves, the laminations being slightly deformed to fit with the grooves as they are pressed into place on the shaft. The rotor core is so shaped as to define a plurality of radially outwardly extending teeth 62, 62 which teeth also extend longitudinally or axially of the rotor and are evenly spaced about the circumference of the rotor. The number of rotor teeth as hereinafter described bears a definite relation to the number of stator teeth and may be varied along with a variation in the number of stator teeth. Preferably, however, and as illustrated, the rotor includes eight teeth which are angularly spaced apart at 45° intervals about the axis of the rotor.

In accordance with the invention, the generator 10 includes a structure providing an evenly spaced annular series of radially inwardly extending stator teeth 64, 64 which surround the annular series of rotor teeth and are spaced therefrom by a thin air-gap. Associated with the stator teeth and fixed relative to the frame 12 is a suitable field coil means adapted when energized by a direct current input to charge half of the stator teeth magnetically north while the other half of stator teeth are charged magnetically south. The magnetic flux set up by this field coil means flows between oppositely charged stator teeth 64, 64 through paths provided by the rotor teeth 62, 62. When the rotor is rotated the reluctance of the flux path through any one of the stator teeth varies periodically due to changes in the degree of alignment or overlap between said tooth and succeeding ones of the rotor teeth, and as a consequence the amount of flux passing through the stator tooth will vary periodically. This periodically varying flux through the stator tooth induces an alternating voltage in an armature coil 65 surrounding the stator tooth. Each of the stator teeth has an individual armature coil 65 wound thereon so that the flux passing through each tooth is active to provide an output voltage. By varying the number of rotor and stator teeth various phase relationships may be established between the different armature coils, but preferably the relationship between the number of stator and rotor teeth is such that the voltage induced in each armature coil will be in phase with the voltage induced in one or more other armature coils. Those armature coils which are of the same phase may then be connected in series to form a phase group and the phase groups then connected in suitable fashion to provide a polyphase output voltage.

Preferably, and as illustrated, the generator is designed to provide a three phase output from the armature coils. This is accomplished by designing the rotor with an even number of rotor teeth 62, 62 and providing three stator teeth 64, 64 for each two rotor teeth. Actually, in accordance with the invention the minimum number of stator teeth is six, since at least three of the teeth must be charged magnetically south and three charged magnetically north. Likewise, any other number of stator teeth must be a multiple of six. The minimum number of rotor teeth is four and any other number must be a multiple of four. Thus, in the illustrated case where the rotor has eight teeth the generator includes twelve stator teeth spaced at 30° intervals.

Considering the 45° physical spacing between adjacent rotor teeth 62, 62 to constitute 360 electrical degrees, it will therefore be seen that the 30° physical spacing between adjacent stator teeth constitutes 120 electrical degrees. Thus, the voltage induced in each armature coil 65 will be plus and minus 120° out of phase respectively with the voltages induced in the two adjacent coils. Counting from any one stator tooth, the voltage induced in the armature coil of every third stator tooth will therefore be in phase with the voltage induced in the armature coil of said one tooth. The armature coils may therefore be electrically connected together to form three phase groups connetced together in the conventional Y or delta fashion to provide a three-phase output.

The means providing the stator teeth may take various forms while nevertheless maintaining the desired even tooth spacing and rotor and stator tooth relationship of this invention. In the illustrated case the stator teeth are provided by four field poles 66, 66 fastened to the inner surface of the annular frame 12, and equally angularly spaced at 90° intervals about the circumference of the rotor. Each field pole 66 includes three equally spaced stator teeth 64, 64 and the arrangement is such that all twelve teeth on the four field poles define an evenly spaced series of teeth surrounding the rotor teeth 62, 62 and spaced therefrom by a thin air-gap 68. That is, the arrangement of the poles 66, 66 is such, and the arrangement of the teeth 64, 64 on the poles is such, that each tooth 64 is angularly spaced 30° from both of its neighboring teeth. Radially outwardly from the teeth 64, 64 each field pole 66 includes a core portion 70 around which is wound a field coil 72.

Each of the field poles 66, 66 in the illustrated example consists of a plurality of laminations axially stacked on a retaining bar 74 passing through aligned openings in the laminations. As shown in FIG. 1 each field pole 66 is in turn securely fixed to the annular frame 12 by a number of screws 76 which pass through openings in the frame and pole member and threadably engage the retaining bar 74. The field poles directly engage the annular frame and the annular frame is made of a magnetic material so as to provide a flux path between adjacent poles. In this regard, it should be noted that one of the features of the generator 10 is that the magnetic flux in all portions of the flux circuit, except for the rotor and stator teeth, is essentially constant which not only reduces the iron noise or hum but also means that the annular frame 12 need not be of a laminated construction in order to avoid hysteresis and eddy current losses.

The four field coils 72, 72 surrounding the four field poles 66, 66 are preferably connected in series and are so wound that when energized by a direct current input they will act to magnetically charge alternate ones of said field poles in opposite magnetic senses. For example, with reference to FIG. 2, the action of the field coils is such that when energized by a direct current the stator teeth on the upper and lower field poles are charged magnetically north, as indicated by the letter N, while the stator teeth on the left and right field poles are charged magnetically south, as indicated by the letter S. Magnetic flux will therefore flow between oppositely charged stator teeth through the rotor teeth with typical flux paths being indicated by the dotted lines 78, 78 in FIG. 2.

When a stator tooth is fully aligned with one of the rotor teeth the flux through the stator tooth will be at a maximum. Likewise, when the same stator tooth is fully aligned with one of the spaces between the rotor teeth the flux through that tooth will be at a minimum. When the rotor is rotated the alignment of the stator tooth with succeeding ones of the rotor teeth will vary so that the tooth is alternately brought into and out of full alignment with rotor teeth and into and out of full alignment with the spaces between the rotor teeth, with the result that the flux through the tooth is cyclically varied between maximum and minimum values. As mentioned previously, this variation in the flux passing through the stator teeth 64, 64 induces voltages in the associated armature coils 65, 65. Since the rotor and stator teeth are evenly spaced and since there are three stator teeth for each two rotor teeth, the voltages induced in adjacent armature coils will be 120 electrical degrees out of phase with each other so that a three phase output may be obtained by connecting in series the corresponding armature coils on each field pole to provide three phase groups with four coils in each group. The manner in which the various coils are interconnected is shown by the schematic diagram of FIG. 5 wherein the subscript $a$ applied to an armature coil indicates that that coil surrounds the first tooth on a field pole, the subscript $b$ indicates coils that surround the middle teeth of field poles, and the subscript $c$ indicates coils that surround the last teeth on the field poles. From this figure it will be noted that the armature coils are connected in series to form three groups of four coils and that the three groups are connected in delta fashion to provide a three-phase output at the points or terminals A, B, and C. The four field coils 72, 72 are connected in series as shown for excitation by a direct current field voltage.

As stated previously, one of the objects of this invention is to provide a generator having a direct current output. This objective is accomplished by incorporating in the generator 10 a rectifying means integrated with the other structure of the generator for rectifying the three-phase output produced at the points A, B, and C so as to produce a direct current output from the generator. The rectifying means may take various forms, but preferably comprises six solid-state diodes or rectifiers, such as silicon diodes, 80a and 80b arranged as shown in FIGS. 3 and 5 and connected to the points A, B, and C to produce a rectification of the three-phase output.

Referring to FIGS. 1, 3, and 5, the three upper diodes 80a, 80a are mounted on the right-hand end piece 16 and electrically insulated therefrom by suitable insulating material as shown at 82. The forward sides of the diodes are connected respectively to the three points A, B, and C while the other sides are connected in common to the positive output terminal of the generator. In the illustrated case the output terminal is shown at 84 in FIGS. 3 and 4 and comprises a bolt with several nuts carried by the end piece 16 and connected with the three diodes 80a, 80a by a conductor member 86. The three lower diodes 80b, 80b are also mounted on the right-hand end piece 16 and are uninsulated therefrom so that their forward sides are connected in common to the end piece and frame which form the negative or ground terminal for the generator output. The other sides of the diodes are connected respectively to the three points A, B, and C. As shown in FIGS. 4 and 5, the frame or end pieces also serve as the negative or ground terminal for the field coils and a separate terminal 88 mounted on the frame and electrically insulated therefrom is provided for connection with the positive side of the field voltage source.

Among the improvements provided by the generator 10, as compared to the Steinmetz machine mentioned earlier, are the provision of the integral rectifying means for producing a direct current output, the improved rotor mounting and generator support provided by the end pieces 14 and 16, and the ventilated construction including the air impeller 60 on the rotor pulley 58. More important improvements reside in the rotor and stator tooth arrangement and configuration which act to increase the electric generating efficiency of the machine. In general these improvements are directed to shortening or otherwise providing better flux circuits in the machine. By arranging the stator teeth in an evenly spaced series better use is made of the available space within the frame, and the number of required rotor teeth is reduced. Also the flux paths are shortened and the flux leakage reduced so as to make better use of the magnetomotive force of the field coils.

It has also been found that improved efficiency is obtained by making the rotor of such a shape that its length is greater than its diameter as measured between the end faces of its teeth. In fact, a rotor length of more than one and one-half times its diameter is preferred. This relative size of the rotor effects a still further shortening of the flux paths passing through the rotor and also, due to the increased length of the rotor, increases the area of the airgap defining surface on the free end of each rotor and stator tooth. Thus the flux density in the airgap and in the rotor and stator iron is reduced so as to reduce the possibility of saturating the iron. In addition the rotor as designed with a length greater than its diameter has a relatively low inertia making it relatively responsive to changes in the speed of the driving belt so as to reduce slippage and wear of the belt.

The invention claimed is:

1. An electric generator comprising an annular frame, a rotor supported within said frame for rotation relative thereto about a longitudinal axis and which rotor includes an annular series of radially outwardly extending teeth which teeth are equally angularly spaced about the rotor circumference, field pole means fixed relative to said frame and defining an annular series of equally angularly spaced and radially inwardly extending stator teeth surrounding said rotor teeth and radially spaced therefrom by a thin air-gap, field coil means fixed relative to said frame and adapted when energized by a direct current to charge half of said stator teeth magnetically north and to charge the other half of said stator teeth magnetically south with said rotor and its teeth serving to provide paths for the flow of magnetic flux between oppositely charged stator teeth, and a plurality of armature coils each wound about a respective one of said stator teeth and adapted to have an alternating voltage induced therein as a result of a periodically varying amount of flux passing through the associated tooth when said rotor is rotated, said rotor having an even number of teeth and said field pole means defining three stator teeth for every two rotor teeth.

2. An electric generator comprising an annular frame, a rotor supported within said frame for rotation relative thereto about a longitudinal axis and which rotor includes an annular series of radially outwardly extending teeth which teeth are equally angularly spaced about the rotor circumference, an even number of angularly spaced field poles fixed relative to said frame and extending radially inwardly therefrom and each of which field poles includes a plurality of radially inwardly extending stator teeth and a radial core portion located radially outwardly from said stator teeth, said teeth being so spaced on each field pole and said field poles being so spaced relative to each other that said stator teeth collectively define an annular series of equally angularly spaced teeth surrounding said rotor teeth and radially spaced therefrom by a thin air-gap, a plurality of field coils each surrounding a respective one of said core portions of said field poles and so wound and interconnected that when energized by a direct current the stator teeth of half said poles are charged magnetically north and the stator teeth of the other half of said poles are charged magnetically south with said rotor and its teeth serving to provide paths for the flow of magnetic flux between oppositely charged stator teeth, and a plurality of armature coils each wound about a respective one of said stator teeth and adapted to have an alternating voltage induced therein as a result of a periodically varying amount of flux passing through the associated tooth when said rotor is rotated, said stator and rotor teeth having longitudinal dimensions more than one and one-half times the diameter of said rotor as measured between the radially outer end faces of said rotor teeth.

3. An electric generator comprising an annular frame, a rotor supported within said frame for rotation relative thereto about a longitudinal axis and which rotor includes an even number of radially outwardly extending teeth equally angularly spaced about its circumference, an even number of equally angularly spaced field poles fixed relative ot said frame and extending radially inwardly therefrom, said field poles each including a core portion and only three radially inwardly extending stator teeth equally spaced and so disposed that the stator teeth of all poles collectively surround said rotor and are equally angularly spaced from each other around the entire periphery thereof, the number of rotor teeth being determined by the total number of stator teeth in the ratio of two rotor teeth for every three stator teeth and said stator teeth being radially spaced from said rotor teeth by a thin air gap, a plurality of field coils each surrounding the core portion of a respective one of said field poles and which field coils are so wound and interconnected that when energized by a direct current the three stator teeth of any one pole are oppositely magnetically charged with respect to the stator teeth of the two adjacent poles with said rotor and its teeth serving to provide varying reluctance paths for the flow of magnetic flux between oppositely charged stator teeth, and a plurality of generating coils each wound on a respective one of said stator teeth and adapted to have an induced voltage generated therein as a result of the periodically varying amount of magnetic flux passing through the associated stator tooth when said rotor is rotated.

4. A direct current electric generator having no slip rings, commutators or other moving contacts, said generator comprising a substantially cylindrical frame, an even number of field poles fixed relative to said frame and extending radially inwardly therefrom and each of which field poles includes a given number of angularly spaced stator teeth so arranged that the teeth of all of said field poles collectively define an evenly spaced circular series of teeth, two end pieces fixed respectively to the opposite ends of said frame, a rotor rotatively supported by said end pieces and including a windingless core of magnetic material having a plurality of teeth evenly spaced in a circular series about the circumference thereof, the number of rotor teeth being in direct relation to the number of stator teeth in the ratio of two rotor teeth for every three stator teeth and said rotor teeth being radially spaced from said stator teeth by a thin air-gap with the result that the reluctance of the flux path through each stator tooth varies periodically as the rotor is rotated due to changes in the amount of overlap between said stator tooth and succeeding ones of said rotor teeth, field coil means adapted when energized by a direct current to charge the teeth of half of said field poles magnetically north and to charge the teteh of the other half of said field poles magnetically south so that magnetic flux flows between oppositely charged stator teeth through said rotor core and its teeth, a plurality of armature coils each wound about a respective one of said stator teeth and adapted to have an alternating voltage induced therein as a result of the periodically vraying amount of flux passing through the associated tooth when said rotor is rotated, rectifier means fixed relative to said frame, and means connecting said armature coils to one another and to said rectifier means in such a manner as to provide a substantially direct current output for said generator.

5. A direct current electric generator having no slip rings, commutator or other moving contacts, said generator comprising a substantially cylindrical frame, an even number of field poles fixed relative to said frame and extending radially inwardly therefrom and each of which field poles includes a total of only three angularly spaced stator teeth, said field poles being equally angularly spaced and said stator teeth being so arranged thereon that the teeth of all of said field poles collectively define an evenly spaced circular series of teeth, two end pieces fixed respectively to the opposite ends of said frame, a rotor supported by said end pieces for rotation relative to said frame about a longitudinal axis and which rotor includes a windingless core of magnetic material located between said end pieces and having two teeth for every one of said field poles, said rotor teeth being evenly spaced in a circular series about the circumference of said rotor core and being radially spaced from said stator teeth by a thin air-gap with the result that the reluctance of the flux path through each stator tooth varies periodically as the rotor is rotated due to changes in the amount of overlap between said stator teeth and succeeding ones of said rotor teeth, field coil means adapted when energized by a direct current to charge the teeth of half of said pole members magnetically north and to charge the teeth of the other half of said pole members magnetically south so that magnetic flux flows between oppositely charged stator teeth through said rotor core and its teeth, a plurality of armature coils each wound about a respective one of said stator teeth and adapted to have an alternating voltage induced therein as a result of the periodically varying amount of flux passing through the associated tooth when said rotor is rotated, means connecting each of the three armature coils on one of said field poles in series with the corresponding armature coils on the other field poles to provide three groups of serially connected coils, and rectifier means fixed relative to said frame and connected with said three groups of coils in such a manner as to provide a substantially direct current output, said rectifier means comprising six solid-state diodes mounted on one of said end pieces, three of said diodes having their output terminals insulated from said latter end piece and electrically connected together to form one terminal of the direct current output, the other three of said diodes having their output terminals electrically connected to said end piece.

(References on following page)

References Cited by the Examiner

UNITED STATES PATENTS

| | | | |
|---|---|---|---|
| 559,419 | 5/96 | Steinmetz | 310—168 |
| 2,119,477 | 5/38 | Weydell | 310—168 |
| 2,525,495 | 10/58 | Lynn | 322—59 |
| 2,934,662 | 4/60 | Robinson | 310—68 |
| 2,945,141 | 7/60 | Van De Graaff et al. | 310—168 |
| 3,041,484 | 6/62 | Freer et al. | 310—68 |
| 3,062,979 | 11/62 | Jarret et al. | 310—168 |

FOREIGN PATENTS

| | | |
|---|---|---|
| 775,208 | 5/57 | Great Britain. |

MILTON O. HIRSCHFIELD, *Primary Examiner.*